Jan. 30, 1962  J. G. DEPONAI  3,018,811
ANTI-SKID ASSEMBLY
Filed March 8, 1961
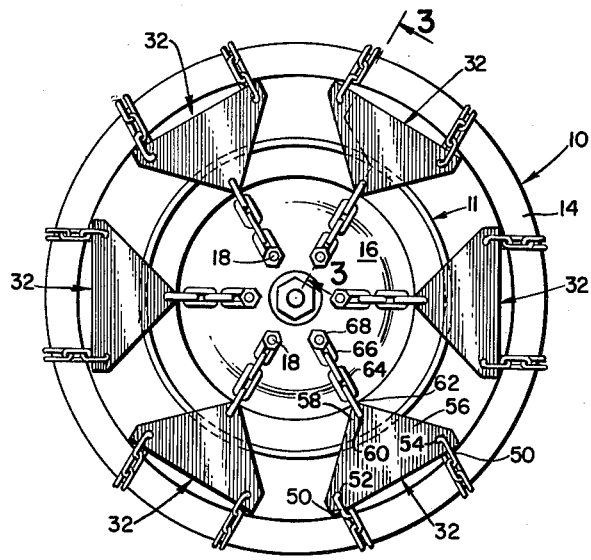
FIG. 1.
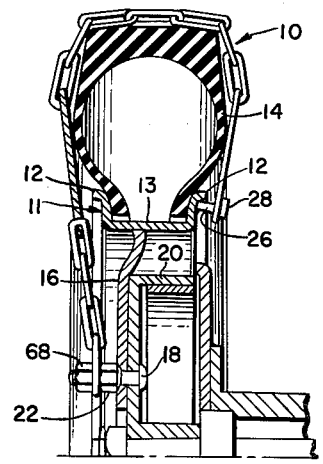
FIG. 3.
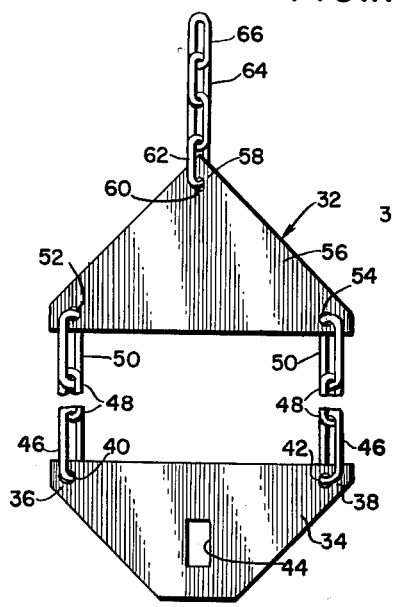
FIG. 5.
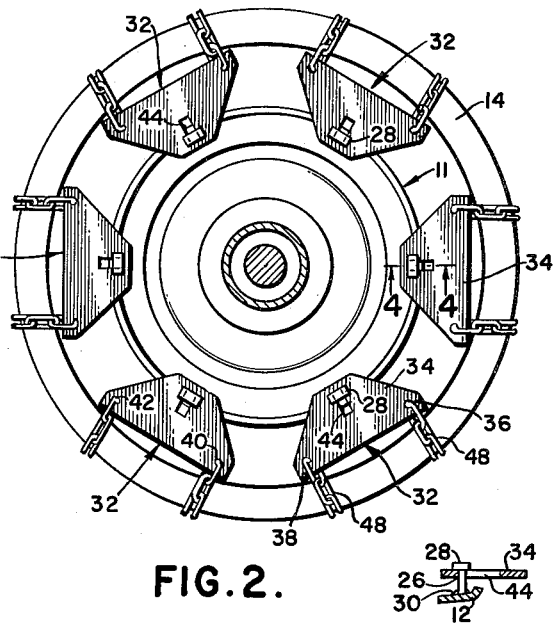
FIG. 2.
FIG. 7.
FIG. 4.
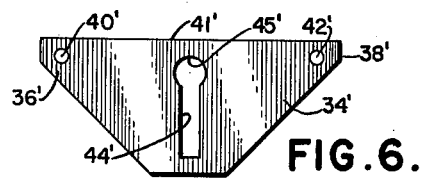
FIG. 6.
INVENTOR
Joseph G. Deponai
BY *Karl W. Flocks*
ATTORNEY

United States Patent Office 3,018,811
Patented Jan. 30, 1962

3,018,811
ANTI-SKID ASSEMBLY
Joseph G. Deponai, 4103 Rollins Ave., Baltimore, Md.
Filed Mar. 8, 1961, Ser. No. 94,223
4 Claims. (Cl. 152—233)

This invention relates generally to anti-skid devices, and more particularly to an improved anti-skid assembly which includes means whereby the assembly may be readily mounted and dismounted with respect to a vehicle wheel without jacking the vehicle up.

An object of the invention is to provide a novel anti-skid assembly which is secured in part on conventional vehicle wheel mounting structure with relatively little modification of the conventional vehicle wheel structure.

A further object of the invention is to provide a novel anti-skid assembly which may be readily mounted on a vehicle wheel without the inherent dangers resulting from jacking up a vehicle during inclement weather and whereby one or more of the novel anti-skid chain assemblies may be utilized.

Other objects and the nature and advantages of the instant invention will become apparent from the following description taken in conjunction with the accompanying drawing, wherein:

FIG. 1 is a side elevation of a vehicle wheel with a plurality of the novel anti-skid assemblies mounted thereon;

FIG. 2 is a view similar to FIG. 1, showing the side opposite that shown in FIG. 1, and illustrating how the novel anti-skid assembly is mounted on the inner surface of the vehicle wheel;

FIG. 3 is an enlarged section taken substantially on the plane of line 3—3 of FIG. 1;

FIG. 4 is an enlarged section taken substantially on the plane of line 4—4 of FIG. 2;

FIG. 5 is an enlarged plan view of one of the novel anti-skid assemblies of the invention;

FIG. 6 is a plan view of another embodiment of the spreader plate of the invention; and FIG. 7 is an enlarged fragmentary section similar to the portion of FIG. 4 showing a modified mounting cleat usable with the spreader plate of FIG. 6.

Referring to the drawing in detail, a conventional vehicle wheel is indicated generally at 10 and includes an annular rim 11 having mounting flanges 12 forming an annular groove 13 which removably receives therein the beads of a vehicle tire 14. The rim 11 includes an inwardly directed annular mounting flange 16 which is apertured, as is conventional, to be received upon mounting studs 18 projecting outwardly from the brake housing drum 20 of the vehicle, and have a portion of the wheel axle protruding therethrough. The rim 11 is retained to the brake housing drum 20 by means of conventional lug nuts 22. The just-described structure is conventional and is described merely for purposes of illustration.

The rim 11 has fixed thereto and projecting outwardly from the tire receiving groove 13, a plurality of mounting cleats 26; see FIGS. 2-4 which include an enlarged rectangular head 28 extending chordally with respect to the rim 11, the cleats being fixed to the rim 11 by means of welds 30, for example. The mounting of the cleats or any equivalent mounting means is the sole change that is required on a conventional tire rim in order to accommodate the novel anti-skid chain assemblies thereon, and the anchor structure could be part of the initial manufacture. The cleats are disposed in substantially 60° space relationship about the inner side of the rim 11, adjacent the outer periphery thereof, and in substantial alignment with the mounting studs 18 of the brake housing.

A novel anti-skid assembly is indicated generally at 32 and comprises an inner spreader plate 34 having a frusto-triangular shape and including transversely through spaced apex portions 36 and 38 transverse apertures 40 and 42, respectively. Intermediately of the plate 34 is a rectangular aperture 44 which is of a slightly greater area than the head 28 of the cleat and may be disposed thereon in the manner indicated in FIGS. 2 and 4 by rotating the plate 34 90° to align the aperture 44 with the head 28 of the cleat, and after the plate 34 is disposed on the cleat 26, the plate 34 will be rotated to the position seen in FIG. 2.

It will be observed that the plate 34 may be readily mounted on the inside of the wheel 10, and no jacking up of the vehicle will be involved. Where it is necessary to dispose one of the plates 34 at the lowermost portion of a wheel which engages a support surface, the vehicle wheel may be rotated slightly in order to accommodate the friction-increasing chains which will subsequently be described, i.e., after a top assembly is installed, it will provide traction to rotate the wheel or vehicle.

Secured in the apertures 40 and 42 are terminal links 46 of a pair of anti-skid or friction-increasing traction chains 48 which will be constructed of a suitable alloy to afford those wear qualities found in anti-friction skid devices of the character involved. The other terminal links 50 of the chains 48 extend through transverse apertures 52 or 54 of a triangularly shaped mounting or spreader plate 56. Extending through the apex portion 58 of the mounting plate 56 is a third transverse aperture 60 which has mounted therethrough the terminal link 62 of an attaching chain 64. If desired, although not shown, the mounting chain 64 may incorporate therein a relatively stiff tension spring to provide means for maintaining the anti-skid assemblies in a relatively snug and fixed position extending transversely of the outer surface of the tire 14 as shown in FIGS. 1-3.

The terminal attaching link 66 of the chain 64 will be received on the mounting studs 18 and retained thereon by means of a secondary retaining nut or mounting lug 68, see FIGS. 1 and 3.

Although six of the anti-skid assemblies 32 are illustrated in this preferred embodiment, it is readily apparent that any number from one to six of the anti-skid assemblies 32 may be utilized.

Although not shown, the conventional hub cap of the wheel 10 may be modified to provide radially-opening and circumferentially spaced apertures or notched out portions to accommodate the chains 64 therethrough.

It will be noted that each of the plates 34 and 56 of the assemblies 32 are secured at a single point, i.e., on the mounting studs 18 or the cleats 26, and the triangularly shaped plates will distribute the tension applied to each of the friction-increasing chains 48, and thus facilitate the mounting of a pair of the friction-increasing chains 48 for each given assembly which accordingly doubles the traction afforded by each of the individual chains 48.

The plates 34 and 56 serve as spreader plates and the assemblies afford 100% more anti-skidding qualities than conventional "strap-type" anti-skid chains.

Referring to FIG. 6, an alternate form of spreader plate is indicated at 34' and includes, adjacent the apex portions 36' and 38', transverse apertures 40' and 42', respectively, which will accommodate therethrough the previously mentioned terminal links 46, see FIG. 5. Extending transversely through the spreader plate 34' and substantially normal to the base or longer side 41' of the spreader plate 34' is an elongated transverse slot or key portion 44' which includes a substantially circular enlarged head portion 45' adjacent the base 41'.

Considering FIG. 7, a fragmentary portion of a wheel flange is indicated at 12' and has extending laterally therefrom a mounting cleat 26' which is secured thereto by means of a weld 30'. The stem 27' of cleat 26' includes a substantially spherical head 28' which will be received through the substantially circular portion 40' of the spreader plate 34' when the anti-skid assembly is mounted on a wheel.

In the alternate embodiment of FIGS. 6 and 7, it will be noted, that it is not necessary to rotate the spreader plate 34' in order to mount the spreader plate on the alternate embodiment of the mounting cleat 26'.

Still further, the anti-skid assemblies 32 may be readily mounted on a vehicle wheel even in deep snow or extremely hazardous conditions without jacking up the vehicle. If the wheels are skidding, one of the uppermost anti-skid assemblies 32, see FIG. 1, will be mounted on the wheel, and upon placing the vehicle in gear or drive, this anti-skid assembly would be rotated toward the support surface to permit the installation of the other anti-skid assemblies.

Although link chains 48 are disclosed in the preferred embodiment, other equivalent anti-skid means, such as rope, wire cable, etc., may be utilized. Further, it will be obvious to those skilled in the art that various changes may be made without departing from the spirit of the invention, and therefore, the invention is not intended to be limited to what is shown in the drawings and described in the specification relative to the preferred embodiment, but the invention is only to be limited as indicated in the appended claims.

What is claimed is:

1. In a wheel assembly including a rim for receiving a tire thereon and including mounting means for removably mounting the rim, anchor means on one side of said rim, and an anti-skid assembly including a first portion detachably connected to said anchor means, anti-skid means fixed to said first portion for disposition transversely of the tread of the tire, a second portion connected to said anti-skid means and disposed on the other side of said rim, and means connected to said second portion and detachably connected to said rim mounting means, said anchor means comprising a laterally projecting cleat portion fixed to said rim adjacent the outer periphery thereof, said first anti-skid assembly portion comprising an apertured plate removably anchored on said cleat portion, said rim mounting means comprising outwardly projecting mounting studs, said second portion of said anti-skid assembly being detachably connected to one of said mounting studs, said anti-skid means comprising elongated elements anchored at terminal ends in spaced relationship with respect to said cleat portion and second portion connected to said mounting stud, said second anti-skid assembly portion comprising a plate including a flexible mounting element anchored at one end in triangular relationship to terminal ends of said elongated elements, said flexible mounting portion including means at its other end detachably engageable on the wheel stud.

2. For use on a vehicle assembly comprising an annular mounting portion including a plurality of radially and circumferentially spaced mounting studs, lug nuts removably received on said studs, a wheel rim including an annular mounting flange having a plurality of circumferentially and radially spaced apertures corresponding to and removably received on said mounting studs for retention thereon by said lug nuts, a tire circumposed about said rim, the improvement comprising anchor means on an inner surface portion of said rim, an anti-skid chain assembly including first terminal mounting means detachably engaged on said anchor means on the inner surface of said rim, said anti-skid chain assembly including an anti-skid chain attached to said first terminal mounting means and extending transversely of the opposed side wall portions and crown of the tire on said rim, said anti-skid chain extending radially in overlying relationship with respect to said annular mounting flange and terminating adjacent one of said mounting studs, said assembly including second terminal mounting means detachably engaged on the one said adjacent mounting stud by one of said lug nuts.

3. The structure as set forth in claim 2; said anchor means comprising a cleat including a stem terminating in an enlarged head portion, said first terminal mounting means comprising an apertured plate element including a key-hole slot therethrough permitting the head portion of said cleat to pass through one portion thereof and removably engaging beneath said cleat head portion at another portion therebeneath.

4. For use on a vehicle assembly comprising a mounting portion including mounting stud means, lug nut means removably received on said stud means, a wheel rim including a mounting flange having aperture means corresponding to and removably received on said mounting stud means for retention thereon by said lug nut means, a tire circumposed about said rim, the improvement comprising anchor means on an inner surface portion of said rim, an anti-skid assembly including first terminal mounting means detachably engaged on said anchor means on the inner surface of said rim, said anti-skid chain assembly including an anti-skid chain attached to said first terminal mounting means and extending transversely of the opposed side wall portions and crown of the tire on said rim, said anti-skid chain extending radially in overlying relationship with respect to said mounting flange and terminating adjacent said mounting stud means, said assembly including second terminal mounting means detachably engaged on said adjacent mounting stud means by said lug nut means.

References Cited in the file of this patent

UNITED STATES PATENTS

| 2,474,521 | Fogarty | June 28, 1949 |
| 2,750,981 | Hoffman | June 19, 1956 |
| 2,751,958 | Weddington | June 26, 1956 |
| 2,925,113 | Kennard | Feb. 16, 1960 |

FOREIGN PATENTS

| 50,891 | France | Aug. 30, 1939 |